US007996639B2

(12) United States Patent
Kano

(10) Patent No.: US 7,996,639 B2
(45) Date of Patent: Aug. 9, 2011

(54) METHOD FOR MANAGING VOLUME GROUPS CONSIDERING STORAGE TIERS

(75) Inventor: Yoshiki Kano, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/750,812

(22) Filed: Mar. 31, 2010

(65) Prior Publication Data

US 2010/0185828 A1 Jul. 22, 2010

Related U.S. Application Data

(63) Continuation of application No. 11/900,440, filed on Sep. 11, 2007, now Pat. No. 7,716,441, which is a continuation of application No. 11/599,494, filed on Nov. 13, 2006, now Pat. No. 7,281,109, which is a continuation of application No. 11/415,592, filed on May 1, 2006, now Pat. No. 7,155,593, which is a continuation of application No. 10/954,385, filed on Sep. 29, 2004, now Pat. No. 7,062,624.

(51) Int. Cl.
*G06F 12/00* (2006.01)
*G06F 12/02* (2006.01)

(52) U.S. Cl. ............ 711/165; 711/6; 711/111; 711/114; 711/161; 711/162

(58) Field of Classification Search ............... 711/6, 111, 711/114, 161–162, 165, 202–204
See application file for complete search history.

(56) References Cited

U.S. PATENT DOCUMENTS

| | | | |
|---|---|---|---|
| 6,757,778 B1 | 6/2004 | van Rietschote | |
| 6,779,078 B2 | 8/2004 | Murotani et al. | |
| 7,222,172 B2 | 5/2007 | Arakawa et al. | |
| 2003/0065898 A1 | 4/2003 | Flamma et al. | |
| 2003/0131182 A1 | 7/2003 | Kumar et al. | |
| 2003/0172149 A1 | 9/2003 | Edsall et al. | |
| 2003/0221063 A1* | 11/2003 | Eguchi et al. | 711/114 |
| 2004/0083202 A1 | 4/2004 | Mu et al. | |
| 2004/0199515 A1 | 10/2004 | Penny et al. | |
| 2004/0260875 A1 | 12/2004 | Murotani et al. | |
| 2005/0010618 A1 | 1/2005 | Hayden | |

FOREIGN PATENT DOCUMENTS

| | | |
|---|---|---|
| JP | 2001-22614 A | 1/2001 |
| JP | 2003-316522 A | 11/2003 |

* cited by examiner

*Primary Examiner* — Jasmine Song
(74) *Attorney, Agent, or Firm* — Mattingly & Malur, PC

(57) ABSTRACT

A tiered storage system according to the present invention provides for the management of migration groups. When a migration group is defined, a reference tier position is determined and the relative tier position of each constituent logical device is determined. Movement of a migration group involves migrating data in its constituent logical devices to target logical devices. The migration group is then defined by the target devices. A virtualization system makes the transition transparent to host devices.

10 Claims, 13 Drawing Sheets

Capacity: 300GB

| Tier | Used LDEV | Free LDEV | Reserved LDEV |
|---|---|---|---|
| 1 | 1, 2, 3, 4, 5 | 10,101,102,103..109 | 100 ... |
| 2 | 11,12,13,14 | 110,111,112,113..119 | |
| 3 | 21, 22, 23, 24 | 121, ...129 | 120 ... |
| ... | ... | ... | ... |
| N | ... | ... | ... |

| Task | Group | Status |
|---|---|---|
| 1 | Group B | On migration |
| 2 | Group A | Wait |
| | | |

| Group | Reference Tier (M) | port : virtual LUN | relative position (I) | |
|---|---|---|---|---|
| Group A | 1 | 1 : 1 | 0 | 1 |
| | | 2 : 2 | -1 | 11 |
| | | 6 : 4 | -2 | 24 |
| Group B | 1 | 1 : 2 | 0 | 2 |
| | | 1 : 3 | 0 | 3 |
| | | 2 : 4 | -1 | 13 |
| | | 2 : 5 | -1 | 14 |
| | | 6 : 2 | -2 | 22 |
| Group C | 2 | 2 : 3 | 0 | 12 |
| | | 6 : 1 | -1 | 21 |
| | | 6 : 3 | -1 | 23 |

Fig. 10

Fig. 11

METHOD FOR MANAGING VOLUME GROUPS CONSIDERING STORAGE TIERS

CROSS-REFERENCES TO RELATED APPLICATIONS

The application is a continuation of U.S. patent application Ser. No. 11/900,440, filed Sep. 11, 2007 (now U.S. Pat. No. 7,716,441), which is a continuation of U.S. patent application Ser. No. 11/599,494, filed on Nov. 13, 2006 (now U.S. Pat. No. 7,281,109), which is a continuation of U.S. patent application Ser. No. 11/415,592, filed on May 1, 2006 (now U.S. Pat. No. 7,155,593), which is a continuation of U.S. patent application Ser. No. 10/954,385, filed on Sep. 29, 2004 (now U.S. Pat. No. 7,062,624), the entire disclosure of which is incorporated herein by reference.

BACKGROUND OF THE INVENTION

The present invention relates generally to data storage systems and in particular to migration of data in a data storage system.

The storage needs of present-day applications have widely varying characteristics. For example, in a database facility, a database application might require high-speed storage to store log files (e.g., redo log files), while the storage of database tables might adequately stored in lower-speed storage. A tiered storage system provides storage volumes having different operational characteristics. Tiered storage systems gives the user (or system administrator) access to a range of performance capability and storage capacity to customize the storage needs for an application. Thus, in the database example, log files might be assigned to a storage volume having high-speed access characteristics. The database tables might be assigned for storage in a lower-tiered storage volume. Tiered storage is especially suitable for managing the cost of storage, by providing flexibility in balancing the changing needs between high speed (expensive) storage and lower performance (low cost) storage in an enterprise.

Data migration must be performed occasionally when the storage capacity of a volume is reached. This involves moving data from the original storage volume to a new storage volume. In a tiered storage system, it might be desirable to maintain the relative tier relationship among the storage volumes associated with an application. High capacity storage systems are increasingly in demand. It is not uncommon that a storage system contains hundreds to several thousands of physical storage devices. Managing such large numbers of physical devices in a tiered storage configuration to effect data migration, where there might be dozens to hundreds of devices at each of a number of tier levels can be a daunting task.

SUMMARY OF THE INVENTION

In accordance with embodiments of the present invention provides migration groups can be provided in a tiered storage facility. Operations on the migration group can include movement of the migration group to a different tier position. Data stored in the logical devices associated with the migration group is migrated to target logical devices, the target devices being selected depending on the new tier position. Relative tier position information among the logical devices in a migration group is maintained, thus preserving the tier hierarchy of the migration group.

BRIEF DESCRIPTION OF THE DRAWINGS

Aspects, advantages and novel features of the present invention will become apparent from the following description of the invention presented in conjunction with the accompanying drawings, wherein:

FIG. 10 shows a simplified GUI explaining operational features of the present invention;

FIG. 11 shows another simplified GUI explaining additional operational features of the present invention;

DESCRIPTION OF THE SPECIFIC EMBODIMENTS

Figure 1:
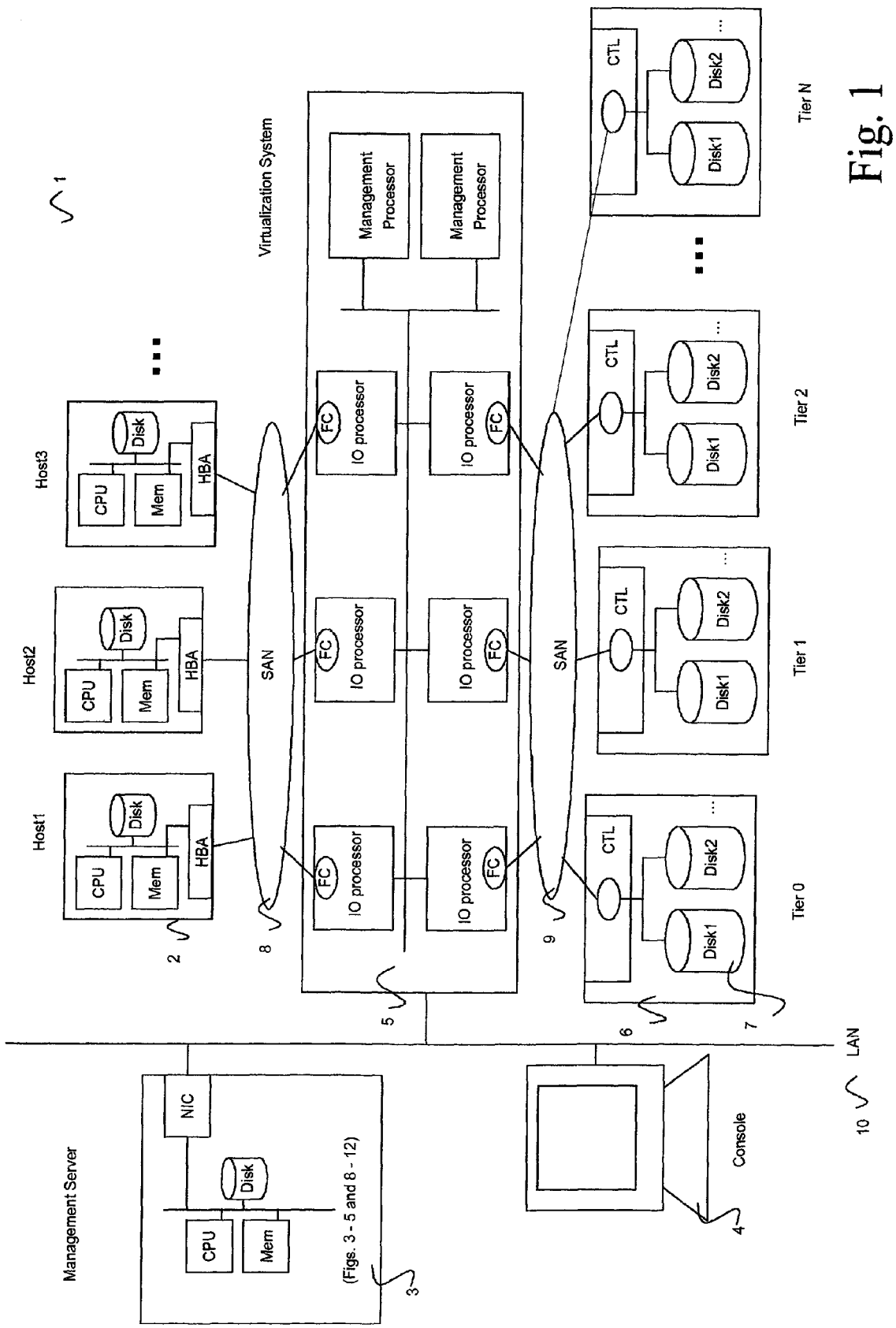
FIG. 1 is a generalized system block diagram illustrating the present invention as embodied in computer system utilizing tiered storage.

FIG. 1 is a diagram illustrating the hardware components and interconnections among components according to one embodiment of the invention. A system 1 includes a plurality of hosts 2 (Host 1, Host 2, Host 3) in data communication with a suitable communication network 8. In the particular embodiment of the present invention shown in the figure, the network 8 is a SAN (storage area network). Each host 2 can be configured with a CPU (central processing unit), memory, FC (fibre channel), HBA (host bus adapter), and disk-storage. Each host may run on an OS (operating system) such as Windows, Solaris, and AIX and so on. Applications running (executing) on a host manage data (reading and writing data) on a storage volume.

The network 8 is in data communication with a storage virtualization system 5. A second communication network 9 connects the storage virtualization system 5 to a plurality of storage subsystems 6. The second communication network 9 can be a SAN.

A management server system 3 is connected to the storage virtualization system 5 over a communication network 10. As shown in FIG. 1, a LAN (local area network) is a typical network that is suitable as the communication network 10. The management server system 3 can be configured with a CPU, memory, and disk-based storage. The management server system 3 can run an OS such as Windows, Solaris, AIX, and the like. As will be discussed below, the management server system 3 is configured to operate in accordance with the present invention.

A user such as a system administrator, can be connected to the communication network 10 using a suitably configured console 4 such as a PC (personal computer) or the like. The management server system 3 and the console 4 can communicate using a protocol such as TCP/IP based Ethernet, Token-Ring, FDDI (fibre distributed data interface), and the like.

An example of a storage virtualization system 5 is the MDS 9000 SERIES of multilayer switches manufactured and sold by Cisco Systems, Inc. Another example of a storage virtualization system is an enterprise PC server system based on the IPStor® Enterprise Edition software produced and sold by FalconStor Software.

As can be seen in FIG. 1, the hardware comprising the storage virtualization system 5 includes a plurality of IO processors, each having an associated FC (fibre channel) port. The FC ports are coupled to the hosts 2 and to the storage subsystems 6. The FC ports can be identified by the WWN (world wide name) which is a convention that is used within the FC specification for assigning a unique identifier to each element within an FC fabric.

The storage virtualization system 5 is further configured with one or more management processors for management of the virtualization system. An internal bus interconnects the internal components of the storage virtualization system 5. The management processors perform the processing necessary to present the hosts 2 with a view of a plurality of virtual logical volumes.

The storage subsystem 6 comprises a plurality of storage devices (physical devices) 7 and one or more controllers (e.g., RAID controller) CTL to access the devices. Each controller typically includes a processor, memory, a network interface card (NIC) such as an Ethernet card or an FC port. The controller might include cache memory comprising non-volatile RAM (NVRAM) to protect against power failures. The controller serves to provide ports each having an associated WWN. Thus, in a SCSI environment, the port WWN serves as the target ID; in an FC configuration the WWN serves as the LUN (logical unit number).

Other operational aspects of each storage subsystem 6 might include a module for creating parity information. In the case of a RAID configuration, there may be a parity disk. As will be discussed below, a module is provided to makes accessible over the ports of the storage subsystem 6. A module might be provided for handling SCSI IO operations; i.e., a SCSI interface.

The controller(s) define one or more storage volumes (also referred to as logical units, LUs) among the storage devices 7 that comprise a storage subsystem 6. Thus, each storage subsystem 6 might have one or more logical units defined on it. Communication with the storage subsystems 6 can be based on SCSI-2 or SCSI-3 command sets (small computer system interface).

Though not shown, it can be appreciated that the storage virtualization system 5 may include an administrative component that can be accessed by a console 4. The administrative component allows a system administrator to perform various tasks needed to initialize and otherwise maintain the storage virtualization system. The storage subsystem 6 might be a component of the storage virtualization system 5, or it might be external storage components that connect to the virtualization system.

Figure 1A:
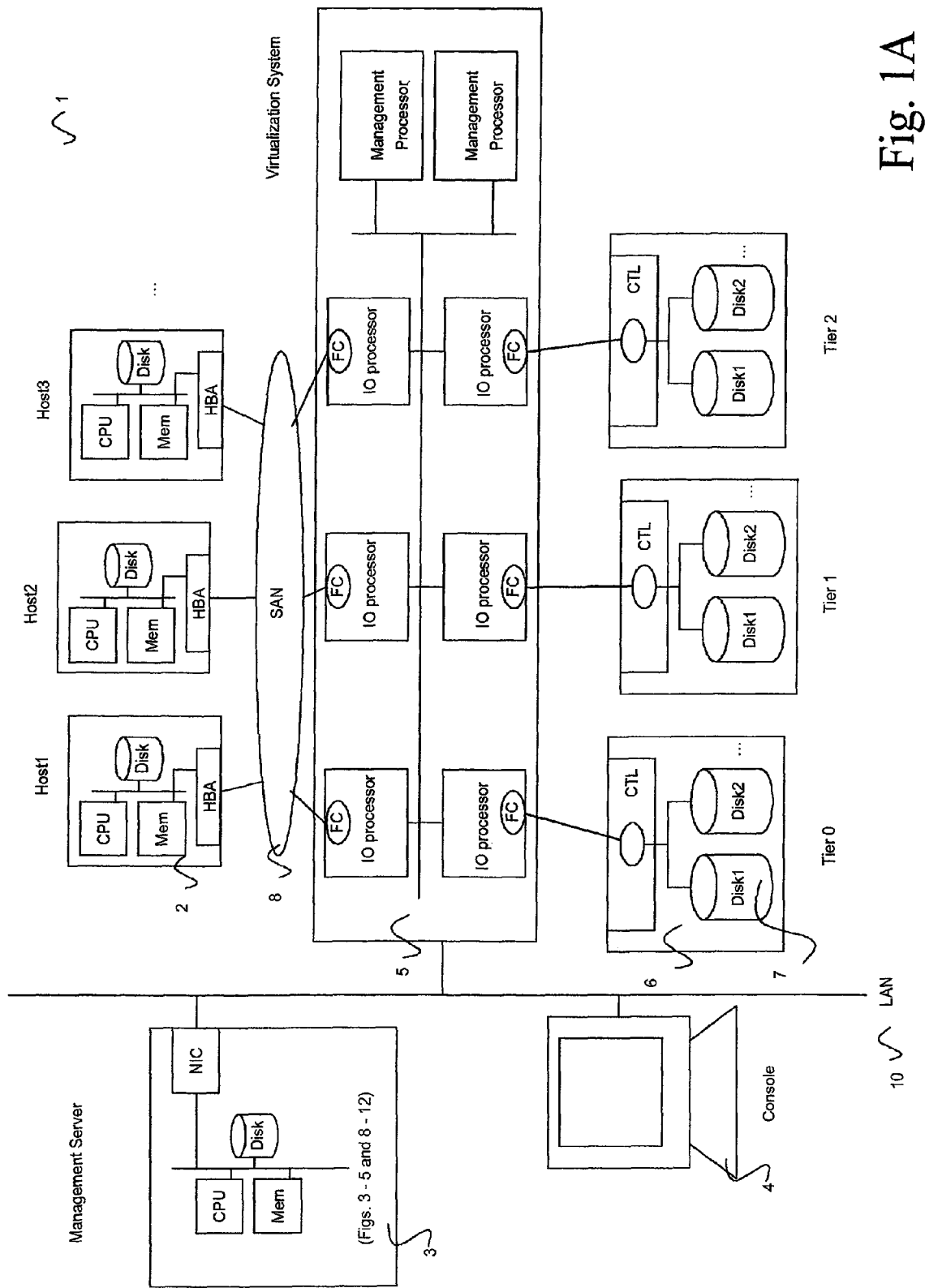
FIG. 1A illustrates a generalized block diagram of an alternative computer system that embodies the present invention.

FIG. 1A shows an alternative to the embodiment shown in FIG. 1. Here, the storage subsystems 6 are connected to the storage virtualization system 5, rather than to the SAN 9 as shown in FIG. 1. It is further noted that functionality of storage virtualization can be provided in the host devices 2, instead of via a separate component such as the storage virtualization subsystem 5.

Figure 2:
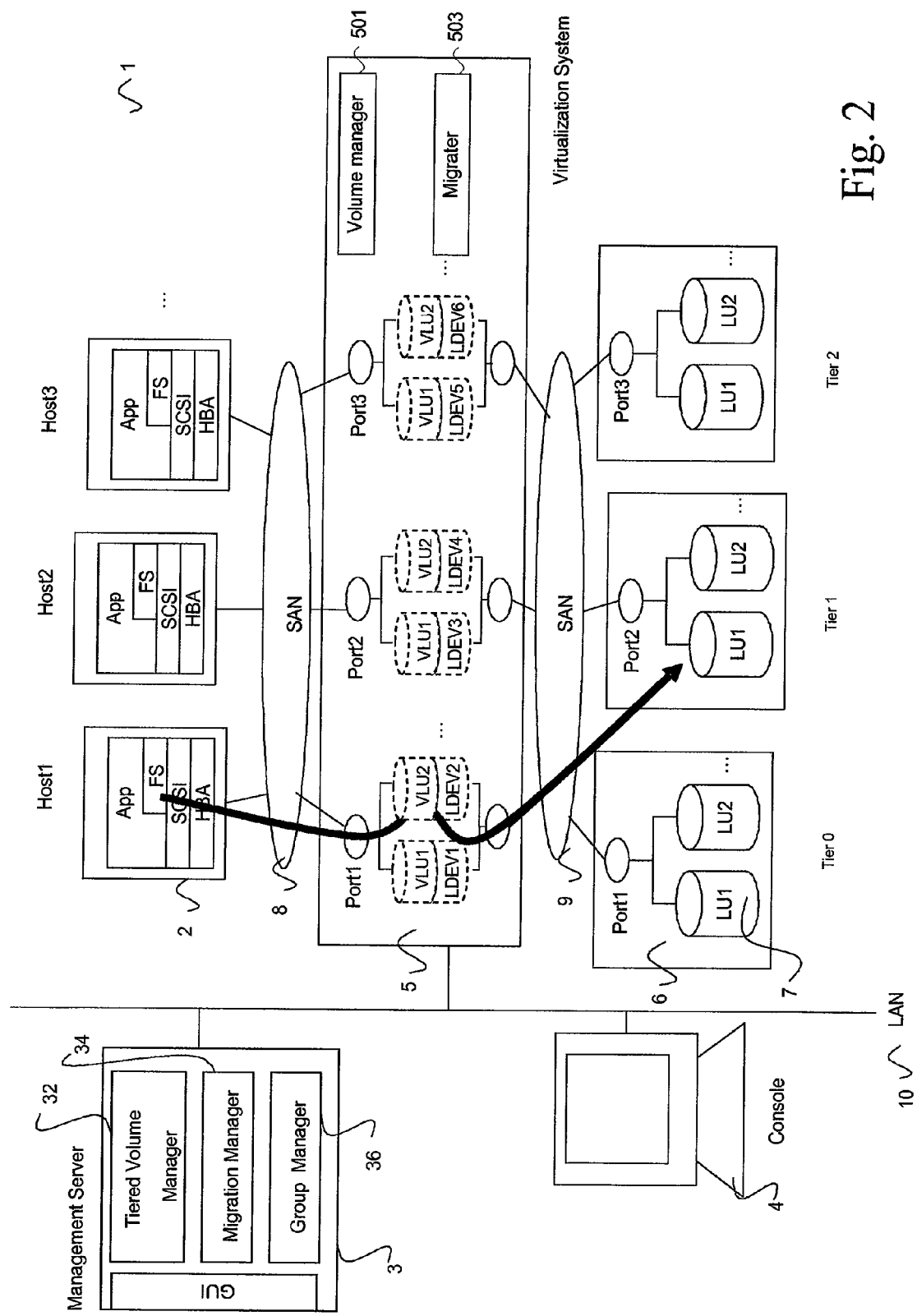
FIG. 2 is a logical representation of the system shown in FIG. 1.

FIG. 2 is a logical view of the embodiment shown in FIG. 1, showing the functional aspects of the embodiment of FIG. 1. The console 4 can provide an HTTP-based GUI for an administrator to access and manage the management server 3, the storage virtualization system 5, and the storage subsystems 6.

The management server 3 can provide services including a GUI that can be accessed by the console 4 over LAN 10. The management server includes a tiered volume manager 32. It can be appreciated, however, that the tiered volume manager function can be provided in the storage virtualization subsystem 5. As will be discussed in further detail below, the tiered volume manager 32 defines manages tiered volumes and assigns tiered volumes to the hosts. A group manager 36 allows a user to create migration groups of virtual logical volumes for migration. A migration manager 34 creates, schedules, and otherwise manages migration tasks to effect migration among the tiered volumes.

Figures 3, 4, 7:
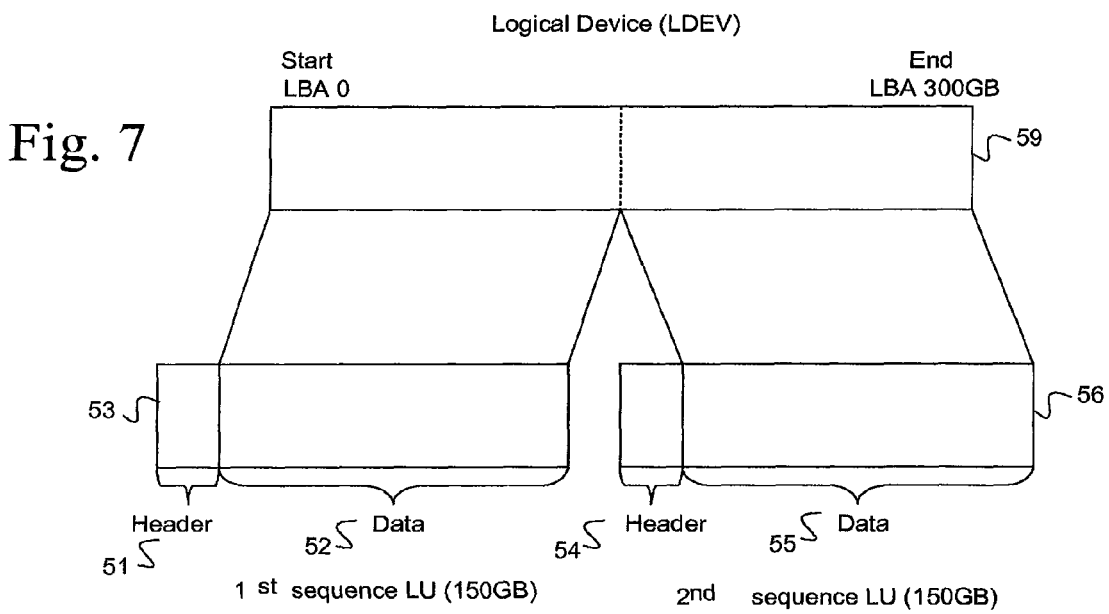
FIG. 3 shows in tabular form, information relating to the tier positions of storage devices in a tiered storage system.
FIG. 4 shows in tabular form, information relating to the scheduling of migration operations on migration groups.
FIG. 7 illustrates the constitution of a logical device from two logical units.

Referring to FIG. 3, the tiered volume manager 32 maintains information relating to logical devices. As will be explained below, logical devices comprise one or more logical units. A logical unit in turn comprises a portion of a physical storage device, or portions of two or more physical storage devices (e.g., level 1 RAID, or higher). The storage virtualization subsystem 5 defines logical devices. Typically, each storage subsystem 6 defines logical units and makes them available to the storage virtualization system 5.

Each of the logical devices is associated with or otherwise assigned to a tier by a system administrator. The logical devices are referred to in FIG. 3 as LDEVs. The assignment of a logical device to a tier can depend on considerations such as access speed of the storage device on which the logical unit is defined, storage capacity and so on.

FIG. 3 shows the information in tabular form in a table 70, where for each tier three sets of logical devices are identified. Column 71 identifies the tier, for example, using integers. Column 73 identifies a list of USED logical devices that are assigned to (or otherwise associated with) that tier. Thus, for example, the USED logical devices associated with tier 1 include the logical devices identified as 1, 2, 3, 4, and 5. The USED logical devices are associated with a virtual logical volume. The operational status of these logical devices is that they are currently in use by the hosts 2.

Column 74 of the tier volume table 70 identifies a list of FREE logical devices that are associated with that tier. For example, the free logical devices in tier 2 include logical devices identified as 110, 111, 112, and 113 to 119. The operational status of these logical devices is that they are not being used by any hosts 2, and thus are not associated with a virtual logical volume. FREE logical devices can be allocated for use, either to serves as storage for a host or for a migration operation (discussed below).

Column 75 of the tier volume table 70 identifies a list of RESERVED logical devices that are associated with that tier. Thus, the RESERVED logical devices for tier 3 include the logical device identified as 120. The operational status of these logical devices is that they are being used in a migration operation. This aspect of the present invention will be discussed further.

The migration manager 34 includes a scheduler for scheduling migration tasks. The migration manager 34 communicates with a migrater 503 which is a functional element in the storage virtualization system 5. The migrater 503 coordinates the migration operation between a source virtual logical volume and a target virtual logical volume. The group manager 36 creates migration tasks that are scheduled by the scheduler component in the migration manager 34. For example, in a UNIX-based OS, the "cron" facility might be employed as the scheduler component.

FIG. 4 shows scheduling information 80 in tabular form that can be used to schedule migration tasks for execution. A task number field 81 identifies the migration task. A target migration group field 82 identifies a group of virtual logical volumes (discussed below); e.g., the table shows Group A virtual logical volumes and Group B virtual logical volumes. A migration status field 83 indicates the migration status of the group, ON (migration is in progress) or WAIT (migration is not occurring). The order of execution of the tasks can be the order in which the tasks are listed in the table 80. Tasks can be inserted anywhere in the list, or be deleted from the list, and re-ordered.

A typical execution sequence might be:
1. Take the next entry in the list that is in the WAIT state; the entry identifies the group of virtual logical volumes for migration.
2. Initiate migration operations on a virtual logical volume comprising the group. This might involve communicating with the migrater 503 to perform the actual migration.

Repeat (2) for each virtual logical volume in the group.
A migration task can be initiated on a periodic basis; for example, every quarter (3 months) one or more migration tasks from the table 80 can be initiated. Alternatively, the table 80 can include timing information that specifies when a migration task is to occur. Yet another alternative is to allow a user (e.g., system administrator) to manually initiate a migration task.

The storage virtualization subsystem 5 includes a volume manager 501 and, as mentioned above, a migrater 503. The volume manager 501 performs the function of creating (or defining) virtual logical volumes comprising logical devices. A logical device in turn comprises one or more logical units, and a logical unit comprises the storage devices 7 in a storage subsystem 6.

Figure 5:
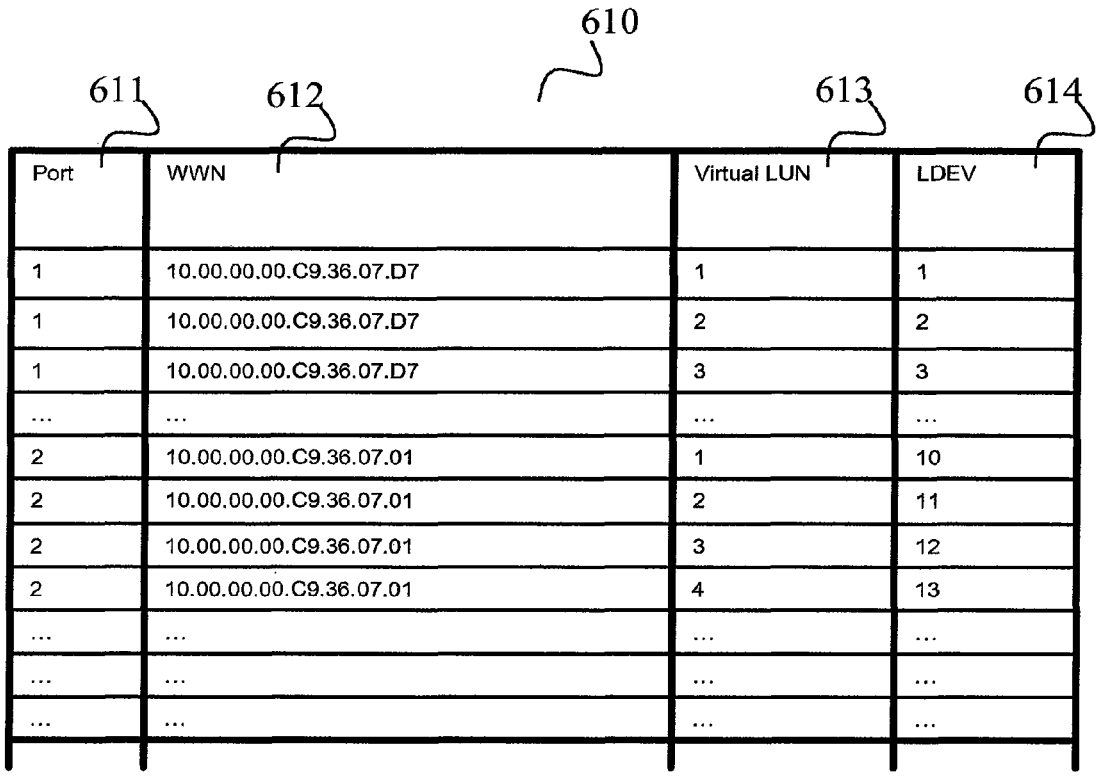
FIG. 5 shows information relating virtual logical volumes to logical devices.

A virtual logical volume is presented to a host 2 via a port; e.g., port 1, port 2, port 3. The volume manager 501 uses two mapping mechanisms to achieve this. First, there is a mapping between the virtual logical volume and the port that is used to access the virtual logical volume. For example, the port can be an FC (fibre channel) port, or a SCSI port. A mapping in the form of a table 610 is shown in FIG. 5. A port is identified by its port number in a port number field 611 and by its WWN in a port WWN field 612. A virtual LUN field 613 identifies the virtual logical volume by way of a logical unit number (LUN). The first mapping is shown between the port fields 611, 612 and the virtual LUN field 613.

The mapping table 610 also includes a mapping between the virtual logical volume and a logical device. In the mapping table 610, this mapping is shown between the virtual LUN field 613 and an LDEV field 614 which identifies a logical device by way of a logical device number (LDEV).

A system administrator can therefore define/assign virtual logical volumes and host associations by filling in the fields in the table 610. Based on the example shown in FIG. 5, it can be seen that an administrator had specified that the virtual logical volumes identified by virtual LUNs 1, 2, and 3 are to be accessed from the port identified by a port number of "1" and having a WWN of 10.00.00.00.C9.36.07.D7. The port WWN field 612 specifies a globally unique "name" of the physical port (see port 1, port 2, port 3 in FIG. 2). A host 2 that wishes to access any of these three virtual logical volumes must send its request to port number 1. More particularly, the host might have a table that stores the WWN of port number 1 and the virtual LUN of the virtual logical volume. When an application executing on a host wants to access, say, virtual LUN 2, a request that identifies virtual LUN 2 and which includes WWN 10.00.00.00.C9.36.07.D7 is communicated to the virtual storage subsystem 5.

Figure 6:
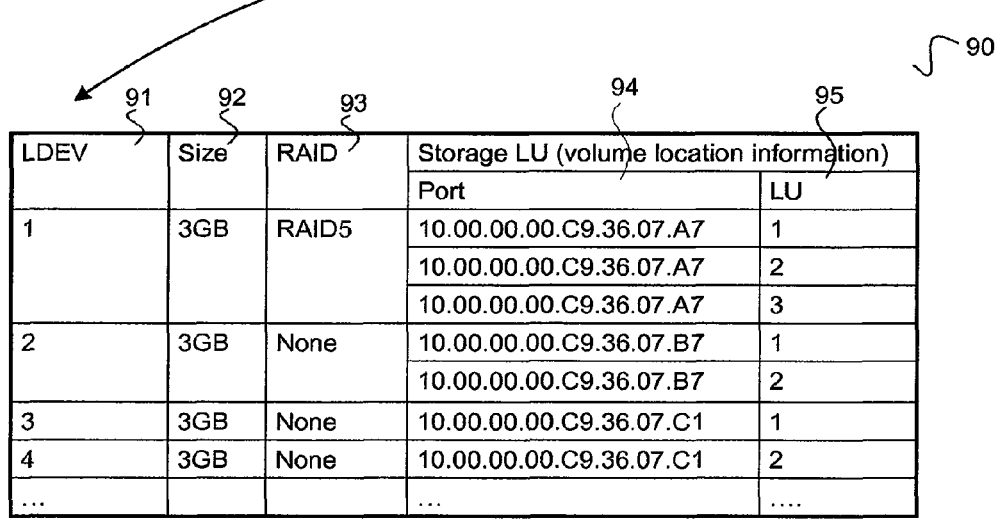
FIG. 6 shows information relating logical devices to their constituent logical units.

FIG. 6 shows the second mapping mechanism which identifies the one or more constituent logical units that comprise a logical device. The table 90 shown in FIG. 6 includes an LDEV field 91 that identifies an LDEV (see the LDEV field of table 610). A size field 92 indicates the storage capacity of the logical device. A configuration field 93 indicates how the logical device is configured. For example, this field might specify a RAID level (e.g., LDEV "1"), indicating that the logical device is configured as a RAID volume. Volume location information identifies the constituent logical units that comprise the logical device. The volume location information includes a port field 94 that identifies the port of a storage subsystem 6 by WWN, and an LU number field 95 that identifies a logical unit within the storage subsystem.

A logical unit within the storage system might be a storage volume that is defined on an entire physical device. A logical unit might be a volume that is defined on only a portion of a physical device, where other portion(s) of the physical device constitute storage volume(s) for other logical unit(s). In the case of a RAID configured volume, the logical unit will typically comprise two or more physical devices. In addition, several logical units may put a same group consisted from RAID configuration. The current RAID standard defines RAID levels 1, 2, 3, 4, and 5. The RAID configured volume can be any one the currently defined RAID levels.

Returning to FIG. 6, there may be more than one volume location information entry for a given logical device if that device comprises more than one logical unit. For example, logical device number "1" comprises three logical units in a storage subsystem having a port identified by the WWN of 10.00.00.00.C9.36.07.A7. As an example, FIG. 7 shows a logical device comprising two logical units from storage in Tier 1. Each logical unit has a storage capacity of 150 GB. As shown in the figure, the logical device 59 has a 300 GB storage capacity. The constituent logical units of the logical device comprises logical unit 53 and logical unit 56, each having a storage capacity of 150 GB. Each logical unit 53, 56 comprises a header area 51, 54 to store header information and a data portion 52, 55 for storing user data. The usable storage capacity for the logical device 59 is therefore 300 GB−size, where size is the sum of the sizes of the headers 51, 54.

Thus, for example, consider the logical unit 53. The header information in its header area 51 includes an LBA (logical block address) offset on the storage device 7 (FIG. 2) of the beginning of its data portion 52. Recall that the logical unit comprises one or more physical storage devices. For example, the logical unit might comprises a portion of one physical device. In the case of a RAID system, the logical unit might comprise portions of two or more physical devices (e.g., stripping). The LBA offset in the header information identifies the location of the first block of the data portion for that logical unit.

The header information also includes the size of the data portion, and can be expressed in units of number of blocks or number of bytes. The header information identifies the port on the storage device with which the logical unit is associated, and the logical unit number (i.e., the field information from fields 94 and 95 in FIG. 6). The header information includes configuration information about how the logical unit is accessed; e.g., concatenation, RAID0/1/2/3/4/5, etc. Sequencing information might be included to identify in the case where more than one logical unit constitutes a logical device. The sequence information identifies the sequence order for the logical unit, among the constituent logical units.

The migrater 503 performs migration operations. On-line data stored on a logical device (that is accessed from a host as a virtual logical volume) can be migrated (copied, moved, etc.) to another logical device (the target logical device). The target logical device can be defined in the same storage subsystem 6 as the source logical device, or the target logical device can be a logical device defined on a different storage subsystem 6.

Recall that migration tasks are defined and scheduled by a scheduling process in the migration manager 34. The scheduling process initiates a migration operation automatically according to the schedule, or alternatively, one can be initiated manually.

The following actions occur when a migration task is performed. For purposes of discussion, the source LDEV is the logical device that contains the data to be migrated and the target LDEV is the logical device to which the data is copied. Prior to performing the migration, the source LDEV is actively accessed by a host device; the host device accesses the logical device as a virtual logical volume per the storage virtualization system 5.

The migrater 503 creates a pair comprising the source LDEV and a target LDEV. The pair indicates a source LDEV and a target LDEV in storage virtualization system to mirror data from source to target one. This involves consulting the table 70 in FIG. 3 to identify a suitable candidate from among the logical devices listed in the FREE logical device field 74. A suitable candidate might be one that has more disk capacity that the source LDEV. Alternatively, the candidate might be one that has lower disk capacity. Access speed might be a criterion for identifying a suitable candidate. When a target LDEV is identified, it is removed from the FREE logical device field 74 and placed in the RESERVED logical device field 75. The source LDEV, likewise, is moved from the USED logical device field 73 to the RESERVED logical device field 75.

The migrater 503 then performs the mirroring operation to mirror data from the source LDEV to the target LDEV. Known mirroring techniques can be used. Depending on the specific mirroring technique being used, the host might be able to continue performing IO with the source LDEV during the mirroring operation; data written by the host would be appropriately mirrored to the target LDEV. Alternatively, host IO to the source LDEV might be suspended. Still another alternative is to direct IO from the host to the target LDEV by remapping the virtual logical volume to the target LDEV (see the next action below). An appropriate mirroring technique might allow for such operations to be performed on the target LDEV during the mirroring process.

The migrater 503 changes the path from the source LDEV to the target LDEV when the mirroring has completed. The target LDEV contains an image of the source LDEV. Subsequent IO from the host should now be serviced by the target LDEV. This is accomplished by updating table 610 and more specifically the LDEV field 614. Initially, the virtual LUN (field 613) that is used by the host to do IO maps to the source LDEV (field 614). The LDEV field 614 must be changed to refer to the target LDEV, so that when the host refers to the virtual LUN in a subsequent IO operation, the virtual LUN will map to the target LDEV.

The migrater 503 then discards the pair.

Referring again to table 70, the target LDEV is moved from the RESERVED logical device field 75 to the USED logical device field 73 to indicate that it is being used with a host. The source LDEV is moved from the RESERVED logical device field 75 to the FREE logical device field 74 to indicate that it is available.

The foregoing is referred to as an "on line" migration method. Another migration method involves the use of a bitmap. The LU maintains a bit map for keeping track of changes for mirror and write I/O from host on target LDEV. If bit map is turn on, namely the blocks in target LDEV for the bit map were modified, then the LU reads data from the latest blocks in target LDEV. If bitmap is turn off, namely the blocks in target LDEV for the bitmap were not modified, then the LU reads data from the blocks in source LDEV. This and still other alternative method for migrating data are known.

As described above, the functionality of the tiered volume manager 32 is provided the management server 3, and the migrater 503 is provided in the storage virtualization subsystem 5. It is understood, however, that these functional components can be provided in the hosts. Thus, for example, instead of the virtualization hardware, these features can be incorporated in a PC or server which has at least a processor, memory, network I/Fs (interfaces) and HBAs (host bus adapters) that serve as ingress or egress ports. As another example, the virtualization functionality can be provided via host-based virtualization software such as Veritas VxVM. In such a case, the storage virtualization system 5 does not provide volume management services, but serves only as a fibre channel switch or a fibre channel hub.

Manipulation of the foregoing tables will now be described in connection with creating virtual logical volumes based tiered storage volumes. The administrator defines logical devices as candidate targets for migration, taking into consideration the tiered storage configuration. Thus for a given tier, the administrator might create a set of logical devices of equal capacity. The logical devices are composed of the logical units provided by the storage subsystems 6. Thus, for example, the administrator might define an entry for Tier 1 as shown in FIG. 3, where the FREE field 74 will initially contain the logical devices 1, 2, 3, 4, 5, 10, 101, 102 . . . , and 109. At this time, the administrator may also create any RAID configurations or none (i.e., a raw volume).

A logical device can then be associated with a virtual logical volume using the fields 613, 614 in table 610 of FIG. 5. This includes assigning a virtual logical volume to a port; e.g., virtual logical volume (virtual LUN 1) is assigned to or otherwise associated with port 10.00.00.00.C9.36.07.D7. Then a logical device is associated with the virtual logical volume. For example, the administrator might select a logical device (e.g., LDEV 1) from tier 1 and associate it with virtual LUN 1. This will cause the logical device LDEV 1 to be moved from the FREE field 74 of table 70 to the USED field 73. Likewise, as other virtual logical volumes identified in field 613 of FIG. 5 are defined and logical devices are associated with the virtual logical volumes, the FREE field 74 and USED field 73 are updated accordingly. Hosts can then access the virtual logical volume by specifying the WWN of the port and the virtual LUN.

Figures 8, 9:
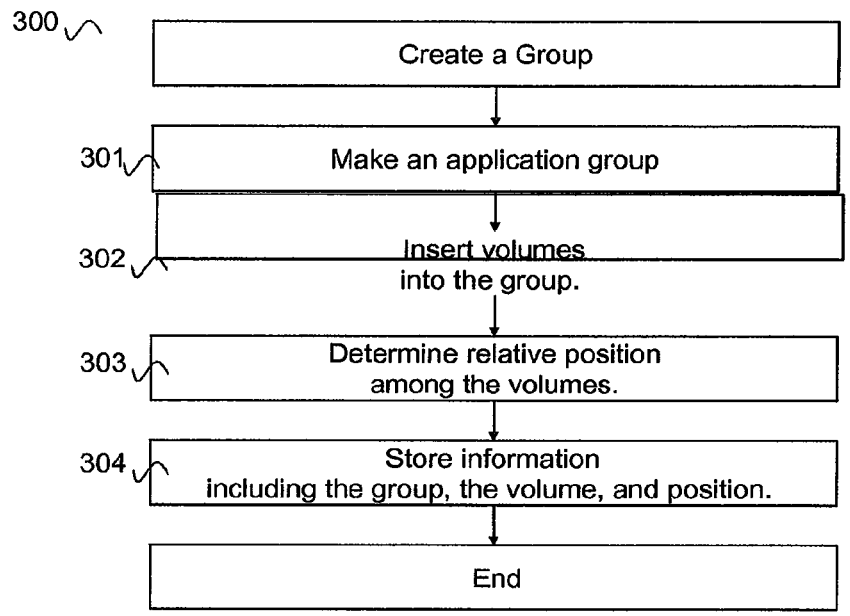
FIG. 8 shows the processing for defining a migration group according to the present invention.
FIG. 9 shows in tabular form the information relating to a migration group in accordance with an embodiment of the present invention.

The discussion will now turn to creation of migration groups using tiered storage volumes. FIG. 8 shows the actions that are performed. In a step 301, an administrator creates a name for an application migration group and assigns virtual logical volumes to the defined group via a GUI. The assignment of virtual logical volumes to the migration group is registered, in a step 302, in an assignment table 40, as exemplified in FIG. 9. The information might be stored in the management server 3. The name of the migration group is stored in a group field 41. For each group, there is an entry for each virtual logical volume that is associated with the group. Thus, the migration group identified as Group A has two virtual logical volumes in the group, identified by their virtual LUNs 1 and 2.

When the assignment of virtual logical volumes to a migration group is made, a relative tier position is determined for each in step 303 for each constituent virtual logical volume in a migration group. The tier position of a virtual logical volume is the tier position of its associated logical device. The relative tier position is a tier position metric that is determined relative to the highest tier position among all the virtual logical volumes comprising the migration group. The information is then stored in a step 304 to memory in the management server 3.

FIG. 9 shows an example of a configuration that an administrator might create. The information is based on information in the tables shown in FIG. 5 and in FIG. 3. Thus, FIG. 9 shows three migration groups: Group A, Group B, and Group C. The constituent virtual logical volumes in a migration group are identified in the virtual identification field 42, with respect to information contained in the table 610 in FIG. 5. More specifically, each virtual logical volume is identified by two values: its virtual LUN (field 613) and its associated port (field 611). Thus, the Group A migration group includes a virtual logical volume accessed over port "1" and is identified as virtual LUN "1". The Group A migration group further includes a virtual logical volume accessed over port "2" that is identified as virtual LUN "2", and a virtual logical volume accessed over port "6" that is identified as virtual LUN "4" (not show in FIG. 5).

Typically, the naming of a virtual logical volume (i.e., it's virtual LUN) is "host-centric". Thus, each host is likely to have a virtual LUN "1", a virtual LUN "2", a virtual LUN "3", and so on. However, each host will access a virtual LUN over a specific port on the virtual storage system 5. Thus, a host A might access its virtual LUN "1" over port "1" on the virtual storage system 5, while a host B might access its virtual LUN "1" over port "2" on the virtual storage system 5. Thus, in the particular embodiment of the present invention shown in the figures, the port number and the virtual LUN are both needed to uniquely identify a virtual logical volume.

For convenience, the notation "port#:LUN#" can be used to uniquely identify a virtual logical volume. Thus in table 40 of FIG. 9, the Group A migration group includes the virtual logical volumes 1:1, 2:2, and 6:4. The Group B migration group includes the virtual logical volumes 1:2, 1:3, and 2:4 (which are shown in FIG. 5) and virtual logical volumes 2:5 and 6:2 (which are not shown in the table exemplar of FIG. 5). The Group C migration group includes virtual logical volumes 2:3, 6:1, and 6:4.

FIG. 9 also shows an initial association of virtual logical volumes to logical devices. Thus, for example, from table 610 it can be seen that virtual logical volume 1:1 is associated with LDEV "1", virtual logical volume 2:2 is associated with LDEV "11", virtual logical volume 1:2 is associated with LDEV "2", virtual logical volume 1:3 is associated with LDEV "3", and so on.

Using the table of FIG. 3, the highest tier position (reference tier field 44) can be readily determined for each migration group. The highest tier position is the highest tier position among the LDEVs in the migration group. Thus, initially, the highest tier position for Group A and Group B is tier position "1". The highest tier position initially for Group C is tier position "2". The highest tier can be referred to as the "reference tier."

The relative position field 43 stores the tier positions of the constituent virtual logical volumes in a migration group relative to the "reference tier" in the migration group, referred to as a "tier hierarchy". An arithmetic subtraction operation can be performed to obtain the relative position. For example, the tier position of virtual logical volume 2:2 in Group A is tier position "1" (because its associated LDEV is 11, which from FIG. 3 is a tier "1" LDEV). The relative position of virtual logical volume 2:2 is therefore:

$$I=M-T,$$

where
I is the relative position (field 43),
M is the reference tier position (field 44), and
T is the tier position of the virtual logical volume.
Thus, the relative position of virtual logical volume 2:2 is "−1".

It can be appreciated that the relative position can be determined with respect to the lowest tiered volume in the migration group, instead of the highest tier position. In that case, the reference tier field 44 would contain the tier position of the lowest tiered LDEV in the migration group.

It can be appreciated that the reference position can be a tier position that is some value between the highest and lowest tier position in the migration group. In such a case, negative and positive relative position number would be needed to indicate whether a virtual logical volume in the migration group is at a higher or a lower tier position than the reference position.

Figures 10, 11:
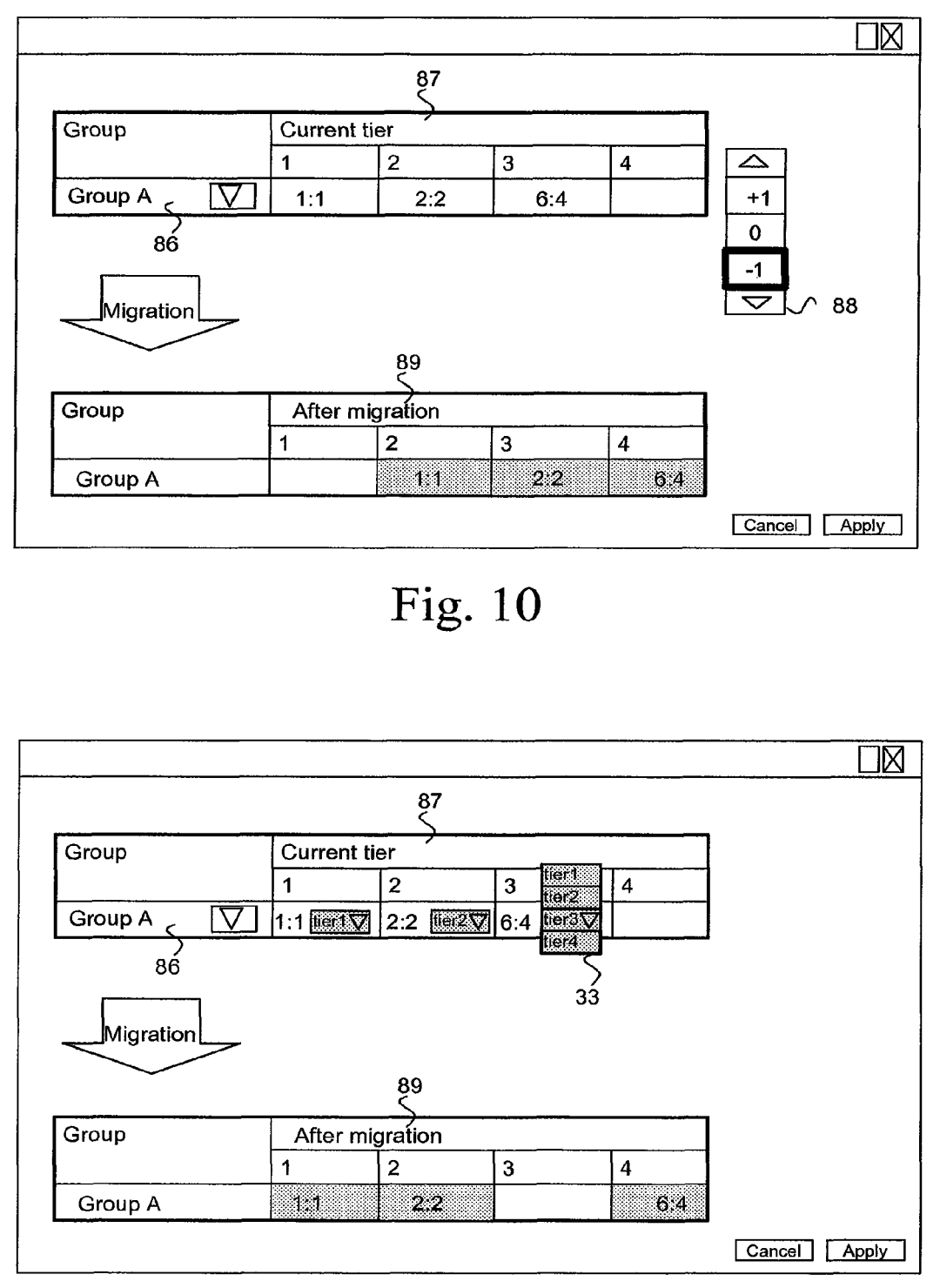

The discussion will now turn to performing a migration operation in accordance with the present invention. FIG. 10 shows a typical graphical user interface (GUI) that might be used by an administrator to perform migration operations. A window 87 can be provided to show the current tier position for virtual logical volumes for a given migration group. The window 87 can include a selection area that allows the user to specify a migration group. Here, the migration group "Group A" is shown having been selected. An indicator in the migration group selection window might be provided to scroll through the list of migration groups, or to present a drop down menu that lists the migration groups.

A tier position area in the window 87 might display the virtual logical volumes that comprise the selected migration group. The example shown in FIG. 10 reflects the information contained in the table 40 in FIG. 9 for Group A. The tier positions are shown and the virtual logical volumes in each tier position are identified.

In accordance with the present invention, movement of a migration group is specified in terms of movement from one tier to another tier. For example, it might be desirable to move the entire migration group "down" one tier position. This means that each constituent virtual logical volume in a migration group would be migrated down one tier position relative to its current tier position. The example shown in FIG. 10 shows just such a situation. Here, the user specified a migration of Group A to the next lower tier position. Thus, for example, the data stored on the logical device associate with a virtual logical volume (i.e., LDEV "1") is migrated to an available LDEV at tier "2" (see FIG. 3). A similar "downward" migration is performed for each constituent virtual logical volume in Group A. Further detail of the migration operation will be discussed below.

As can be seen in FIG. 10, a floating menu 88 might be activated (e.g., by performing a right-button click on a two- or three-button input device) to allow the user to specify the number of tier positions and the migration direction. Here, the floating menu displays that information in a relative manner. Thus, a "+1" might mean a migration to the next lower tier position. A "+2" would then specify a migration to a tier position that is two positions lower. A "−1" would indicate migration to a tier position that is one position higher than the current tier position. In the display shown in FIG. 10, each constituent virtual logical volume in a migration group migrates by the same number of positions and in the same direction.

FIG. 11 shows a GUI display which features migration of individual virtual logical volumes within a migration group. This allows for redefining the tier hierarchy within a group. A menu 33 can be provided for each virtual logical volume that allows the user to specify a new tier position for that virtual logical volume. The menu 33 also illustrates an alternative approach to specifying a tier position. The floating menu 88 in FIG. 10 uses a relative position metric to indicate a new tier position. The menu 33 uses absolute tier position references. The example in FIG. 11 shows that tier 4 is highlighted for virtual logical volume 6:4, indicating that the data on the logical device currently associated with virtual logical volume 6:4 (i.e., LDEV "24", FIG. 9) is to be migrated to a replacement logical device that is selected from tier 4.

Referring to FIG. 9, the relative position (I) in the entry for the virtual logical volume 6:4 must be updated to reflect that of the replacement logical device. The relative position for the logical device being replaced (in this example, LDEV "24") is "−2". The relative position of the replacement logical device (a tier 4 device) would be "−3"; the table of FIG. 9 would be updated to show "−3".

FIGS. 10 and 11 each shows a window 89 that shows the result of the migration operation. In FIG. 10, the window 89 shows that the each of the virtual logical volumes in migration Group A have been migrated to a lower tier position, by the same number of positions. In FIG. 11, the window 89 shows that only one virtual logical volume in the migration Group A has been migrated.

Alternatively, the window 89 can be a "preview" window used to display the configuration before actually performing the migration. In a storage facility that contains thousands of physical drives, a preview window might be especially helpful in running through "what if" scenarios. Of course, it can be appreciated that the present invention is applicable to storage systems of any size. To complete the discussion of FIGS. 10 and 11, an APPLY button can be provided to allow a user to initiate or schedule the migration operation.

It can be appreciated that the interfaces shown in FIGS. 10 and 11 are simplified interfaces, used for explanatory purposes. Additional display features can be readily provided to accommodate a suitable display of the information in the table 40 of FIG. 9 and other convenience features that might facilitate the user's task.

Figure 12:
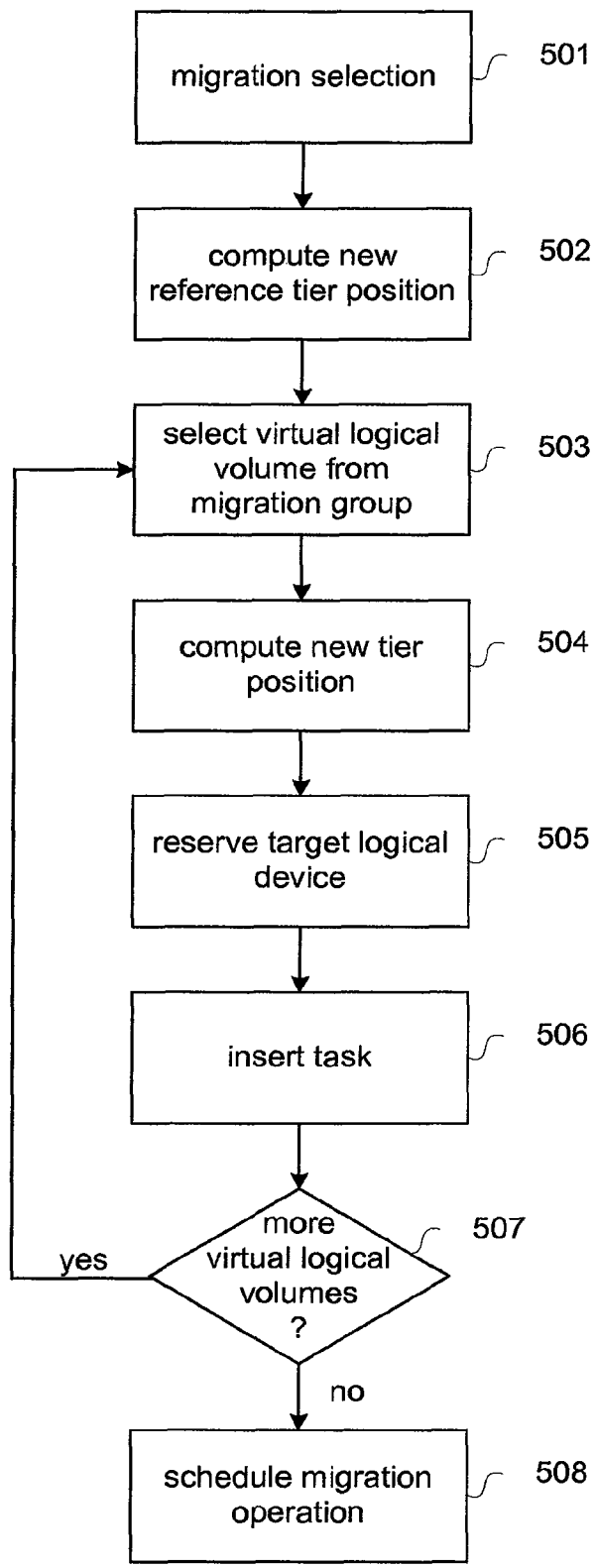
FIG. 12 shows the processing for moving a migration group in accordance with the present invention.

Referring now to FIG. 12 a discussion will be made of the actions that can be performed by the migration manager 3 when the user activates the APPLY button. At a step 501 the process begins when information is communicated to the migration manager that indicates a selected migration group and a tier position change ($\Delta T$). The relative position change indicates the direction and number of tier positions to move the migration group, meaning that the constituent virtual logical volumes are moved to a new tier position indicated by $\Delta T$.

In a step 502, a new reference tier position (field 44, FIG. 9) is computed. In this particular embodiment, the reference tier position (M) is defined as the highest tier position among the logical devices associated with the virtual logical volumes. Thus, the new reference tier position ($M_{new}$) is computed using the relative position change information. For example, if the migration manager receives a delta value, $\Delta T$ (e.g., $\Delta T=+2$, $\Delta T=-1$), then that delta value can be simply added to the current reference tier position to determine the new reference tier position; hence, $M_{new}=M_{current} \Delta T$. Using this convention then, a positive valued $\Delta T$ represents movement to a higher numbered tier position. Based on the convention adopted below, this represents migration of data to lower performance storage. Conversely, a negative valued $\Delta T$ represents migration to a lower numbered tier position which represents higher performance storage.

In steps 503 through 507, the new tier position for each virtual logical volume is computed. The new tier position will be used to select the logical device as the migration target for the data that is stored on the logical device currently associated with the virtual logical volume.

Thus, in step 503, a virtual logical volume is selected from the selected migration group. In step 504, a new tier position is computed for the virtual logical volume. This involves performing the following computation:

$$T_{new}=M_{new}-I,$$

where
  $T_{new}$ is the new tier position,
  $M_{new}$ is the newly computed reference tier position, and
  I is the relative position (field 43).
This computation is derived from the computation used to determine the relative position above. The specific computation for $T_{new}$ of course depends on how the relative position is determined.

If $T_{new}$ exceeds the maximum number of tier positions, then it can be set to the highest numbered tier position. Likewise, if $T_{new}$ is less than "1" (i.e., the lowest numbered tier position), then it can be set to "1". Some other convention can be adopted, of course.

In step 505, using the example given above, the table 70 is searched for a logical device in tier position 1 ($T_{new}$). In particular, the FREE field 74 is searched and a free LDEV from among the available tier 1 LDEVs and placed in the RESERVED field 75. This logical device will serve as the target of a subsequent migration operation. In step 506, a migration task is inserted into a task list; this includes identifying the logical device currently associated with the virtual logical volume, either explicitly or by referencing the virtual logical volume, and identifying the target logical device.

In step 507, a determination is made whether there are any more virtual logical volumes to process. If there are more virtual logical volumes to process, then the process returns to step 503.

When all the virtual logical volumes have been assigned to a target logical device, then processing proceeds to a step 508. The task list includes a list of migration tasks for each of the virtual logical volumes in the selected group. The task list is then scheduled for a migration operation at a suitable time, which can be specified by the user or can be automatically scheduled according to some predetermined schedule.

Thus, the notion of moving a migration group to a new tier position (e.g., by specifying a delta value, $\Delta T$) involves migrating each constituent virtual logical volume from its current tier position to a new tier position depending on $\Delta T$. Migrating a virtual logical volume involves migrating the data stored on its associated logical device to a logical device selected from the new tier.

Figure 13A:
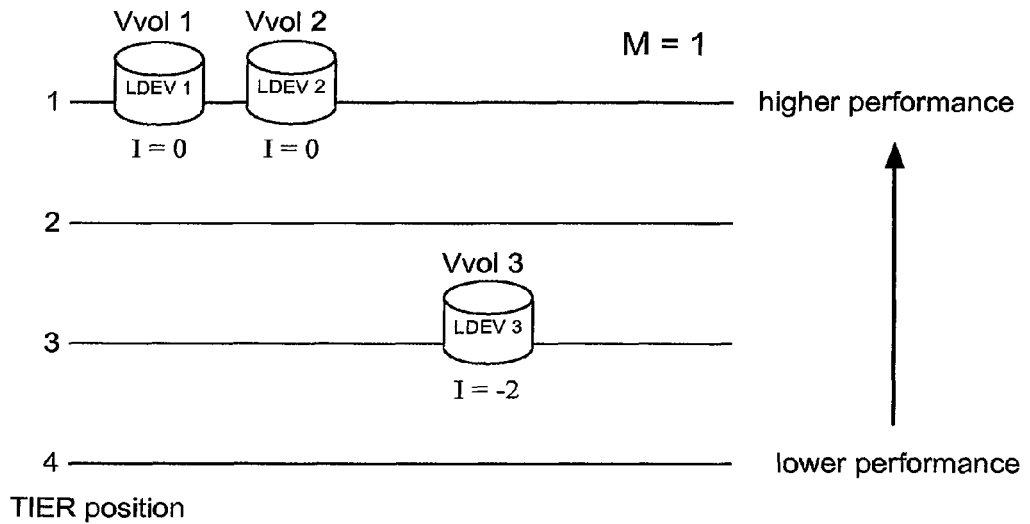
FIGS. 13A-13C illustrate an example of moving a migration group.

The discussion will now turn to some illustrative examples of operation of the present invention. FIG. 13A shows an initial configuration of a newly defined migration group comprising the virtual logical volumes identified as Vvol 1, Vvol 2, and Vvol 3. The virtual logical volume Vvol 1 is associated with logical device LDEV 1. Thus, when a host accesses Vvol 1, the storage system 5 maps the access to LDEV 1. Likewise, the virtual volume Vvol 2 is associated with logical device LDEV 2, and the virtual volume Vvol 3 is associated with the logical device LDEV 3.

The figure also shows the tier positions of the logical devices. The reference tier position (M) for this migration group is "1". The relative tier position (I) for each virtual logical volume and its logical device is also shown. The convention for discussing tier positions is that the lowered number position represents a "higher" tier in terms of performance. Performance is typically determined based on criteria such as access speed, storage capacity, reliability, and so on; but is not limited to such criteria and might vary from one storage facility to the next.

Figure 13B:
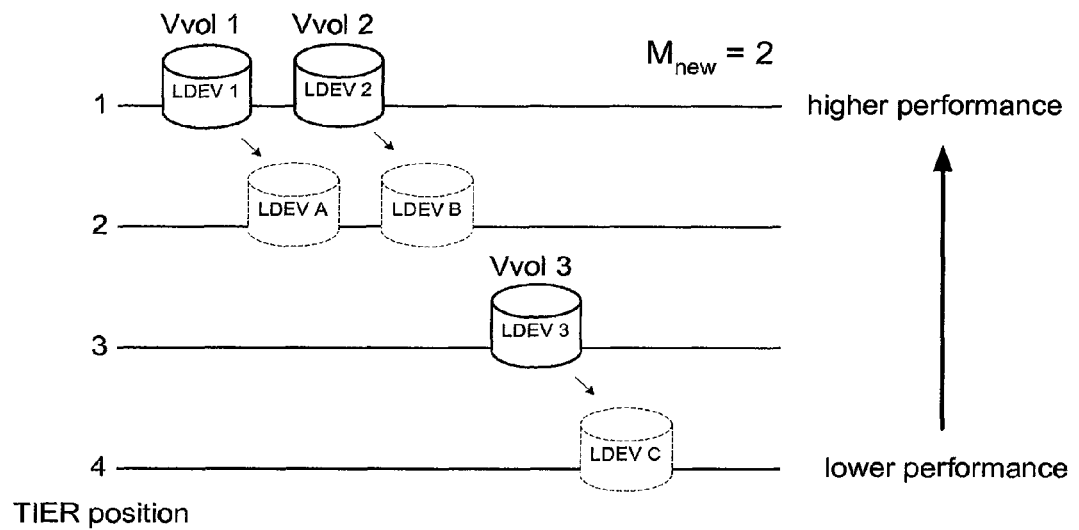

Now suppose a user such as a system administrator decided to move the migration group to a lowered number tier; i.e., to a lower performance tier position. Thus, the user might want to move the entire migration group down by one tier position; i.e., $\Delta T=+1$. FIG. 13B shows the tier positions of the migration target logical devices LDEV A, LDEV B, and LDEV C, selected according to the process of FIG. 12. Note that the relative tier positions of the target logical devices is maintained. At a scheduled time, the migration is performed, where data stored in LDEV 1 is migrated to LDEV A, data stored in LDEV 2 is migrated to LDEV B, and data stored in LDEV 3 is migrated to LDEV C.

Figure 13C:
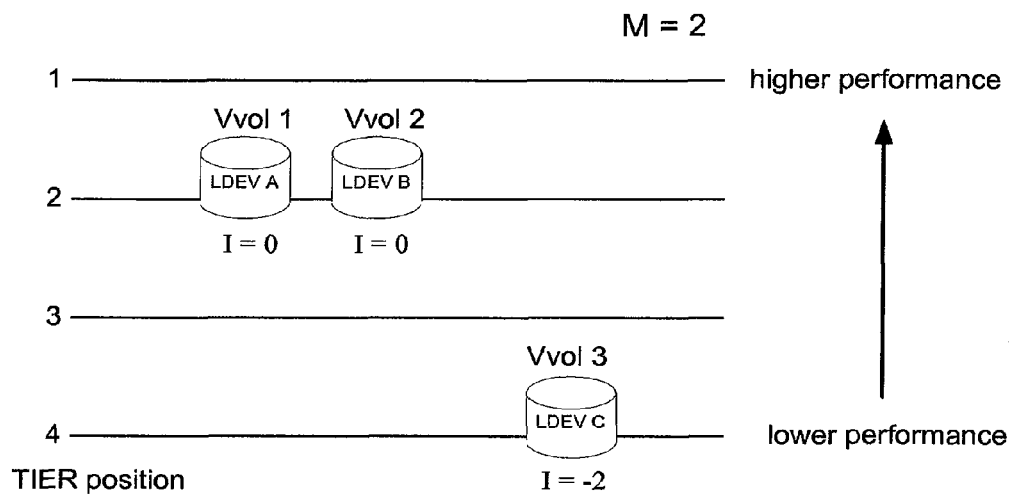

FIG. 13C shows the result after the migration operation. The virtual logical volume Vvol 1 is now associated with the logical device LDEV A. Similarly, the virtual logical volume Vvol 2 is now associated with the logical device LDEV B, and the virtual logical volume Vvol 3 is now associated with the logical device LDEV C. The virtual logical volumes are deemed to have been migrated, and the migration group is deemed to have been moved. Note that the reference tier position (M) is now 2. Note further that the relative tier positions (I) do not change.

Figure 14A:
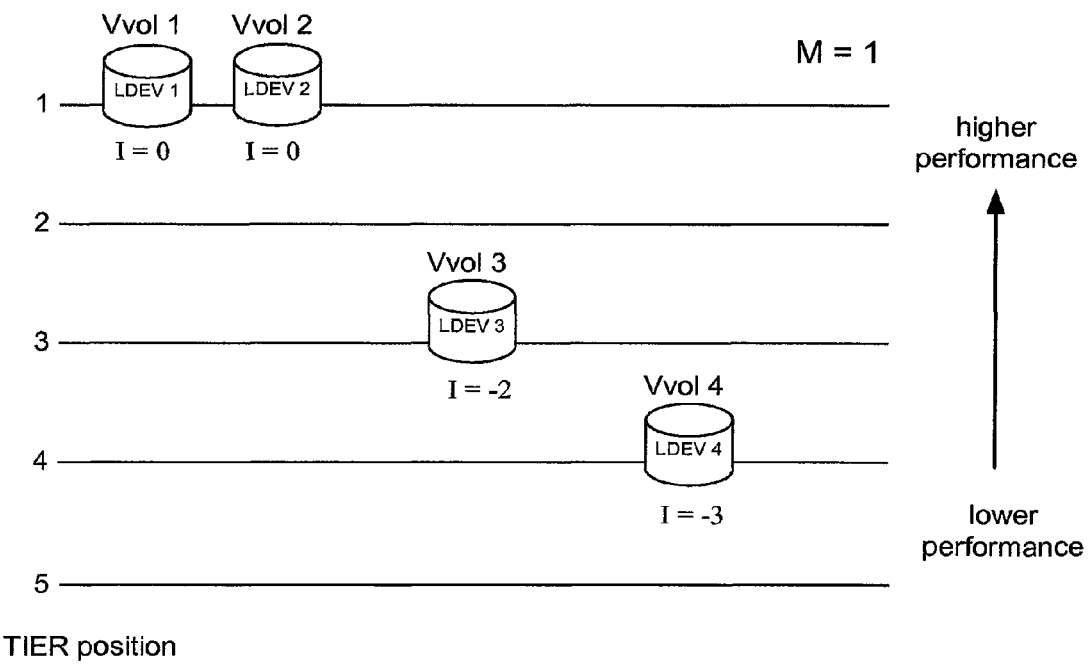
FIGS. 14A-14F illustrate a further example of moving a migration group.

FIG. 14A shows a configuration of another migration group, comprising four virtual volumes Vvol 1 to Vvol 4. The virtual logical volumes are associated respectively with logical devices LDEV 1 to LDEV 4. This configuration shows there are five tier positions. The reference tier position (M) is 1 and the relative tier position (I) for each virtual logical volume and its associated logical device are indicated in the figure.

Figure 14B:
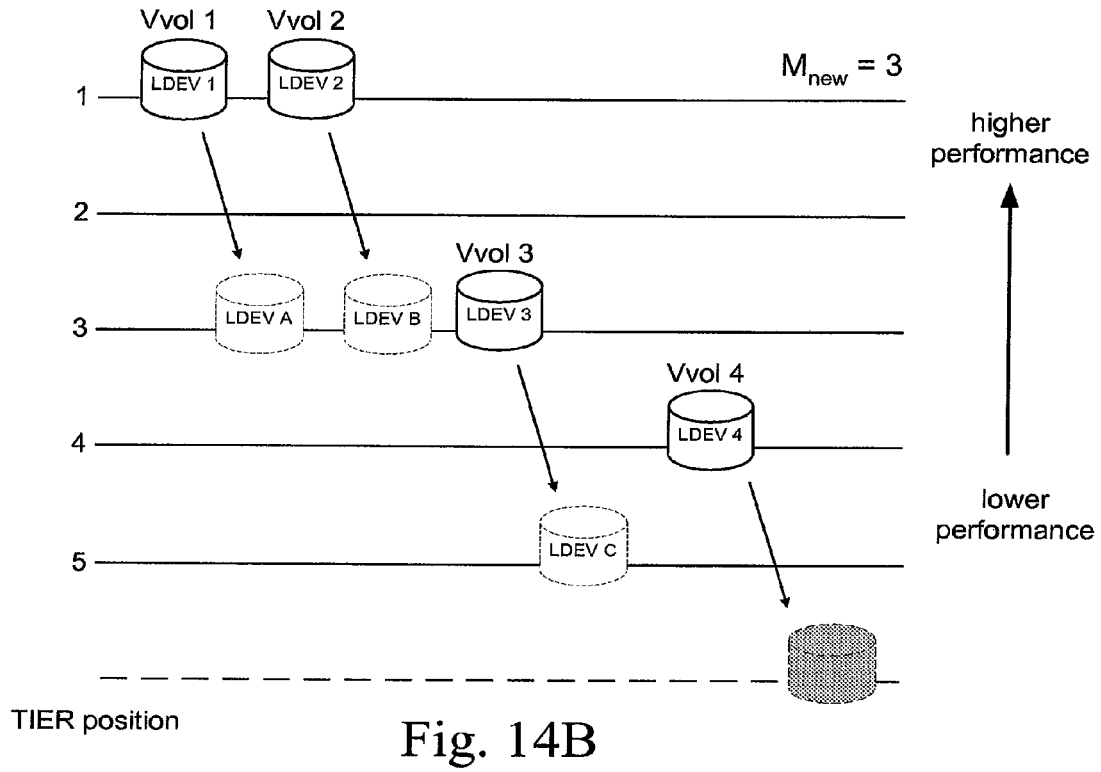
Figure 14C:
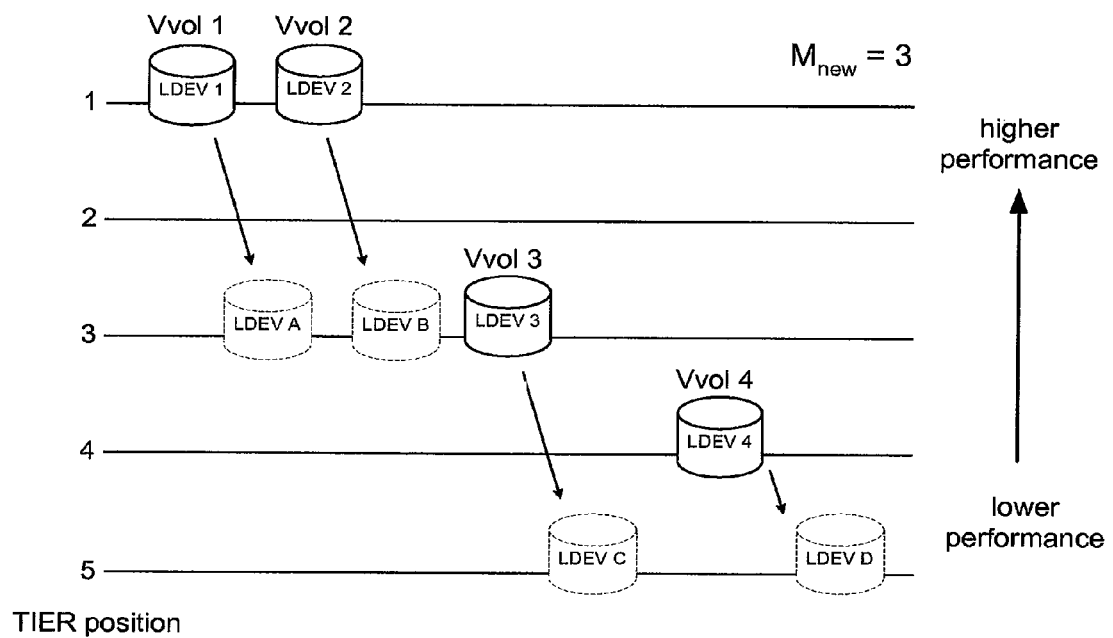

Suppose a user desires to move the migration group down by two tier positions; i.e., to a lower performance tier; i.e., $\Delta T=+2$. FIG. 14B shows the resulting tier positions of the target logical devices LDEV A to LDEV D. The target logical devices for migration of data in LDEV 1 and LDEV 2 are logical devices LDEV A and LDEV B, respectively. They are in tier position 3 (two tier positions lower than LDEV 1 and LDEV 2). The target logical device for migration of data in logical device LDEV 3 is LDEV C, which is a logical device in tier position 5.

Figure 14D:
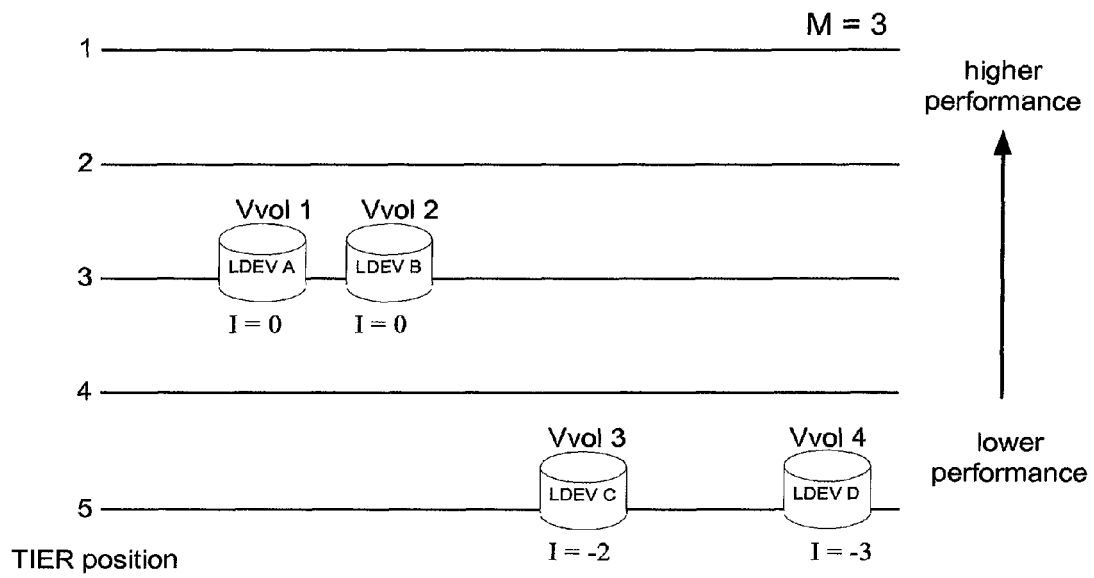

As for logical device LDEV 4, the migration target logical device should be a logical device in tier position 6. However, tier position 6 is a position that is lower than the lowest tier position, namely, tier position 5. Thus, as discussed in step 504, the migration target logical device will be selected from an available logical device in the lowest existing tier position, namely, tier position 5. FIG. 14D shows the resulting set of migration target devices LDEV A-LDEV D, where the tier hierarchy of the migration group is somewhat "flattened" because of the limited number of physical tier positions.

FIG. 14D shows the resulting configuration after the migration has completed. The virtual logical volumes are re-assigned to the new logical devices. The reference tier position (M) is now 3. Of note is the relative tier positions (I) for each virtual logical volume and its associated logical device. The relative tier positions (I) reflect the initial relative tier positions at the time the migration group was defined, and do not change when the migration group as a whole is moved. The significance of this aspect of the present invention will now be discussed.

Figure 14E:
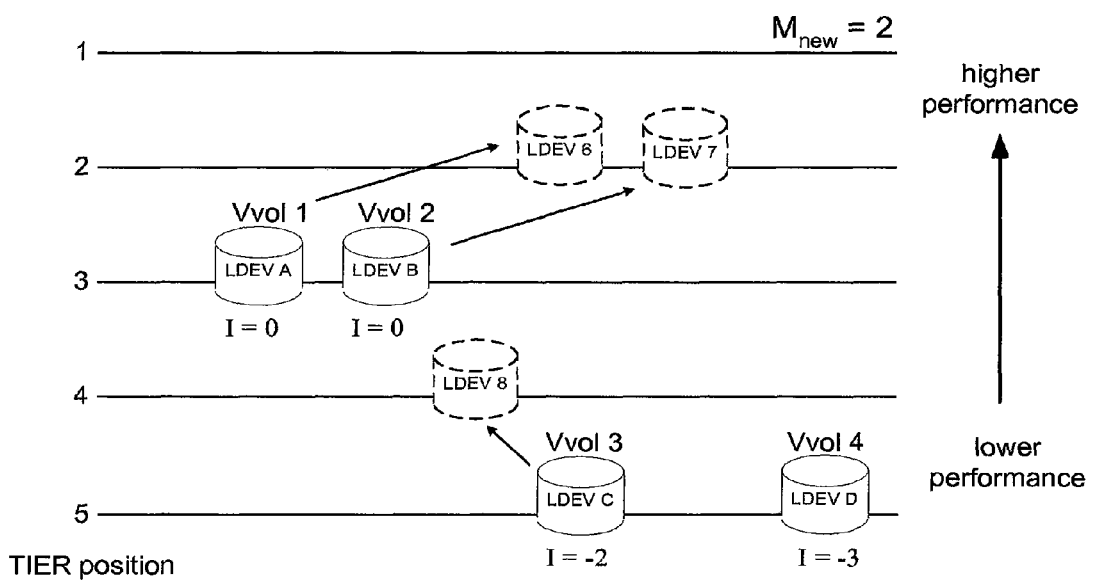

Referring to FIG. 14D as the starting configuration, suppose now that the user decides to move the migration group up one tier position to a higher performance tier. The new reference tier position will be $M_{new}=2$, as shown in FIG. 14E. In accordance with step 504, the tier position for each migration target logical device is computed using the new reference tier position and the relative tier position (I) for each virtual logical volume. Thus, the tier position of the migration targets for the logical devices (LDEV A, LDEV B) presently associated respectively with Vvol 1 and Vvol 2 is tier position 2. FIG. 14E shows that logical devices LDEV 6 and LDEV 7 are tier 3 devices and have been selected to be the migration targets.

Similarly, the migration target for LDEV C (currently associated with virtual logical volume Vvol 3) is a logical device in tier 4. FIG. 14E shows that logical device LDEV 8 is a tier 4 device and has been selected to be the migration target for LDEV C.

Now for the migration target for Vvol 4. According to step 504 the new tier position for Vvol 4 is computed as follows: $T_{new}=M_{new}-I$; $M_{new}$ is 2 and I is −3, and so the tier position for the migration target logical device is 5. However, since the logical device associated with Vvol 4 is already a tier 5 device, a migration operation is not needed. Moreover, the tier hierarchy has re-expanded, and the relative tier positions among the virtual logical volumes in the migration is restored.

Figure 14F:
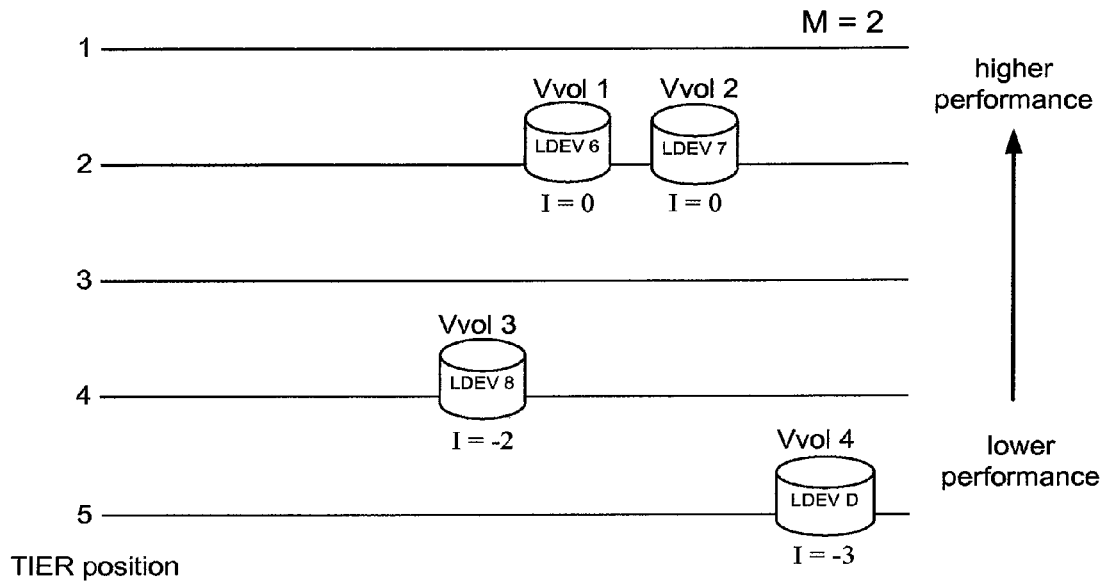
Figure 14E:
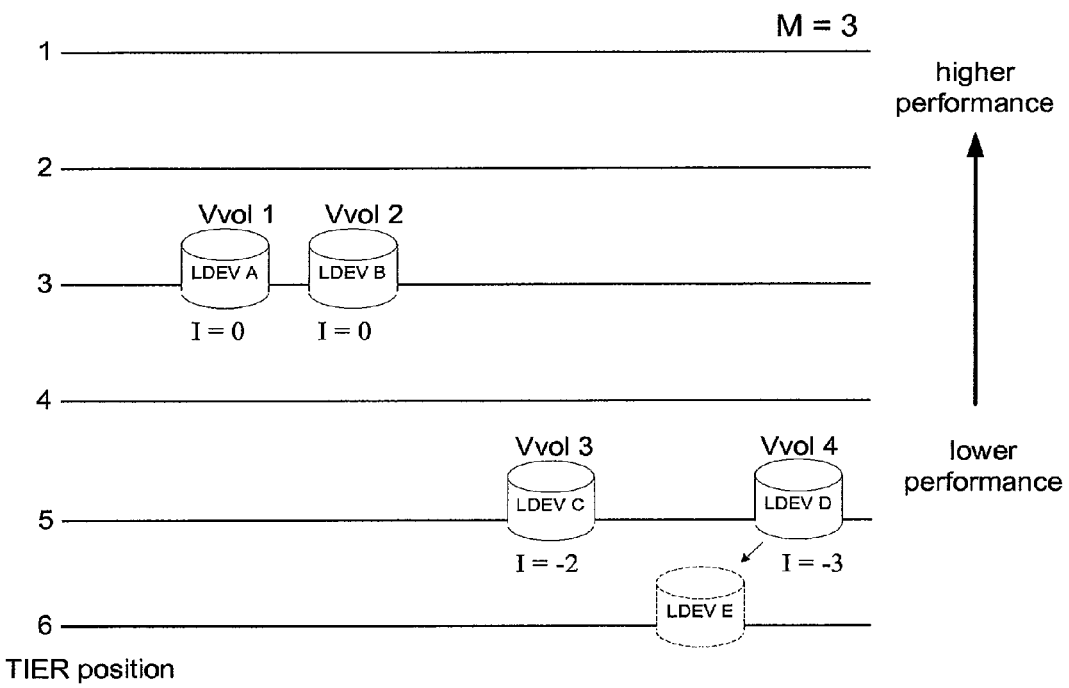

FIG. 14F shows the configuration of the migration group after the migration operation has completed. Comparing to FIG. 14A, it can be seen that the relative tier positions of the logical devices (LDEV 6 to LDEV 8, and LDEV D) that are now associated with the virtual volumes (Vvol 1 to Vvol 4) is restored, despite the "flattening" effect on Vvol 4 that occurred in FIG. 14D. Thus by preserving the relative tier position (I) values, the relative tier positions in a migration group can be "flattened" to any degree and then subsequently restored. Thus, a migration might be specified that migrates all the logical volumes to the lowest performance tier position (e.g., suitable when an enterprise experiences financial trouble), thus flattening the tier hierarchy of the migration group. The migration can then be re-expanded to higher performance tiers when the enterprise recovers and is ready to resume business.

Referring now to FIG. 14E', another benefit of preserving the relative tier position arises when a new tier position is defined. Thus, starting from the configuration shown in FIG. 14D, consider when a new tier position is added as shown in FIG. 14E' that is a lower performance tier than tier 5, namely, tier position 6. A suitable interface can be provided that allows a user to specify re-expanding a migration group to at least partially restore the tier hierarchy of a flattened migration group.

Thus, in FIG. 14E' a logical device LDEV E is shown to be available in tier position 6. A user can initiate an operation to expand the tier hierarchy of the migration group. The result is that the data in the logical device LDEV D (associated with virtual logical volume Vvol 4) would be migrated to LDEV E. The virtual logical volume would then be associated with LDEV E.

The examples shown in the figures illustrate "flattening" of the tier hierarchy at the bottom of the tier. However, a similar flattening effect can be observed if the migration group is migrated up to higher performance tier positions. For example, in FIG. 13A, suppose the migration group is migrated by two tier positions to a higher performance tier. The delta value (ΔT) would be −2, using the convention discussed above in connection with step 502. There will be no migration for logical devices LDEV 1 and LDEV 2 since tier position 1 is the highest performance tier position. Logical device LDEV 3 will be migrated to an available tier 1 logical volume. As a further observation, the new reference tier position (M) will be M=−1. Recall that the new reference tier position is computed by adding the delta value (ΔT) to the current reference tier position, hence:

$$M_{new} = M_{current} + \Delta T,$$

$$M_{new} = -1,$$

where in FIG. 13A $M_{current}$ is 1.

What is claimed:

1. A computer readable program code module for a virtualization system stored on a computer readable storage medium, wherein the virtualization system is coupled to a plurality of storage subsystems which store data written by a host device, each of the plurality of storage subsystems presenting a data storing area configured with a plurality of physical storages as a storage resource to the virtualization system, which is configured to map a first migration group, the first migration group comprising a first portion of a data storing area defined as a first tier and a second portion of a data storing area defined as a second tier, the computer readable program code module comprising code executable by a processor to perform a method comprising the steps of:

displaying current tier positions of the first migration group;

displaying tier positions to which one of the current tier positions may be migrated;

receiving information from a user specifying to which tier position the one of the current tier positions is to be migrated; and displaying the tier position after migration, wherein the migration is executed by migrating data in the first migration group to a second migration group, the second migration group comprising a third portion of a data storing area defined as a third tier and a fourth portion of a data storing area defined as a fourth tier, and wherein a relationship of tier position between the third tier and the fourth tier is based on a relationship of tier position between the first tier and the second tier.

2. The computer readable program code module of claim 1, wherein the current tier positions are indicated by a number of the tier positions.

3. The computer readable program code module of claim 1, wherein the tier positions to which the one of the current tier positions may be migrated are indicated by a number of the tier positions.

4. The computer readable program code module of claim 1, wherein the tier positions to which the one of the current tier positions may be migrated are indicated by a number of the tier positions and a migration direction.

5. The computer readable program code module of claim 1, wherein the method further comprises the step of displaying current tier positions of the second migration group.

6. A display method for a virtualization system, wherein the virtualization system is coupled to a plurality of storage subsystems which store data written by a host device, each of the plurality of storage subsystems presenting a data storing area configured with a plurality of physical storages as a storage resource to the virtualization system, which is configured to map a first migration group, the first migration group comprising a first portion of a data storing area defined as a first tier and a second portion of a data storing area defined as a second tier, the display method comprising the steps of:

displaying current tier positions of the first migration group;

displaying tier positions to which one of the current tier positions may be migrated;

receiving information from a user specifying to which tier position the one of the current tier positions is to be migrated;

migrating data in the first migration group to a second migration group, the second migration group comprising a third portion of a data storing area defined as a third tier and a fourth portion of a data storing area defined as a fourth tier; and displaying the tier position after migration, wherein a relationship of tier position between the third tier and the fourth tier is based on a relationship of tier position between the first tier and the second tier.

7. The display method of claim 6, wherein the current tier positions are indicated by a number of the tier positions.

8. The display method of claim 6, wherein the tier positions to which the one of the current tier positions may be migrated are indicated by a number of the tier positions.

9. The display method of claim 6, wherein the tier positions to which the one of the current tier positions may be migrated are indicated by a number of the tier positions and a migration direction.

10. The display method of claim 6, further comprising the step of displaying current tier positions of the second migration group.

* * * * *